United States Patent
Bahat et al.

(10) Patent No.: US 8,099,727 B2
(45) Date of Patent: Jan. 17, 2012

(54) SYSTEM AND METHOD FOR PROVIDING UNINTERRUPTED OPERATION OF A REPLICATION SYSTEM DURING A SOFTWARE UPGRADE

(75) Inventors: Lior Bahat, Kerem Maharal (IL); Orly Devor, Zichron Yaakovv (IL); Dvir Koren, Ramat-Ishay (IL); Ofer Elrom, Moshav Nir-Yafe (IL)

(73) Assignee: NetApp, Inc., Sunnyvale, CA (US)

( * ) Notice: Subject to any disclaimer, the term of this patent is extended or adjusted under 35 U.S.C. 154(b) by 1264 days.

(21) Appl. No.: 11/756,904

(22) Filed: Jun. 1, 2007

(65) Prior Publication Data
US 2008/0301663 A1    Dec. 4, 2008

(51) Int. Cl.
*G06F 9/44* (2006.01)
(52) U.S. Cl. ......... 717/168; 717/171; 717/172; 717/178
(58) Field of Classification Search .................. 717/170, 717/171, 172, 176, 178, 167
See application file for complete search history.

(56) References Cited

U.S. PATENT DOCUMENTS

| | | | | |
|---|---|---|---|---|
| 5,359,730 A | * | 10/1994 | Marron | 717/169 |
| 5,758,154 A | * | 5/1998 | Qureshi | 713/1 |
| 7,191,284 B1 | * | 3/2007 | Gupta et al. | 711/114 |
| 7,778,959 B2 | * | 8/2010 | Fries et al. | 707/609 |
| 2006/0041881 A1 | * | 2/2006 | Adkasthala | 717/168 |

OTHER PUBLICATIONS

Mukesh Singhal "Update Transport: A New Technique for Update Synchronization in Replicated Database Systems", Dec. 12, 1990, pp. 1325-1336.*

* cited by examiner

*Primary Examiner* — Wei Zhen
*Assistant Examiner* — Phillip Nguyen
(74) *Attorney, Agent, or Firm* — Cesari and McKenna, LLP

(57) ABSTRACT

A software upgrade tool and procedure provide uninterrupted operation of a replication system during an upgrade of software components of the system. The replication system includes one or more user systems coupled to one or more target storage systems over a communications network, such as a computer network. Illustratively, each user system is embodied as a replication client, while each target storage system is embodied as a replication server. In addition, the replication system includes a management system embodied as a management server that manages configuration of the system, including during upgrade of the software components of the replication system. To that end, the software upgrade tool cooperates with the management server to query the configuration of "old" versions of the software components and to manage upgrades of those components to "new" versions of software. According to the invention, the upgrade tool and procedure enable both the old and new versions of the software components to run concurrently on the replication client and replication server, as well as the management server.

21 Claims, 4 Drawing Sheets

SYSTEM AND METHOD FOR PROVIDING UNINTERRUPTED OPERATION OF A REPLICATION SYSTEM DURING A SOFTWARE UPGRADE

FIELD OF THE INVENTION

The invention relates to replication systems and, more specifically, to an upgrade tool and procedure for providing uninterrupted operation of a replication system during a software upgrade.

BACKGROUND OF THE INVENTION

Replication is typically employed as part of a data backup and recovery storage strategy and, as such, denotes the movement of data from a source storage space (e.g., one or more source volumes) of a primary site or "source domain" to a target storage space (e.g., one or more destination volumes) of a secondary site or "target domain" via a communications network (e.g., a computer network) in such a way that enables recovery of applications from the destination volume. As used herein, recovery denotes loading of the applications on possibly different host or user systems (e.g., computers) where they can access the destination volume, instead of the source volume, resulting in the applications loaded to a valid state. Also, a volume denotes any storage medium, such as a disk, having addresses that enable data to be accessed in a stable way and, as such, may apply to file system access, block access and any other storage access means.

The source domain contains at least the source volume, but may also contain the user systems embodied as, e.g., replication clients, a switching fabric and any source replication components situated outside of those components. In this context, a component may either be a physical entity (e.g., a special replication appliance) and/or software entity (e.g., an application and/or device driver). In remote disaster recovery, for example, the source domain includes an entire geographical site, but may likewise span multiple geographical sites. The target domain includes all of the remaining components relevant for replication services, including the destination volume coupled to a target storage system embodied as, e.g., a replication server. In addition, a replication system includes components that may be located in both the source and target domains.

The replication system typically has at least one component, i.e., a write interception component, which intercepts storage requests (e.g., write operations or "writes") issued by the replication client to the source volume, prior to sending the intercepted writes to the destination volume. When issuing a write, a user application executing on the replication client specifies an address on the source volume, as well as the contents (i.e., write data) with which the volume address is to be set. The write interception component may be implemented in various locations in the source domain depending on the actual replication service; such implementations may include, e.g., a device driver in the replication client or logic in the switching fabric.

For example, assume the replication client is one of many independent (non-coordinated) replication clients that span various geographical locations of a source domain. Further, assume that a user application or multiple (coordinated) user applications issue writes for storage on a source volume of the replication client. These writes must be intercepted by the write interception component and replicated consistently on a destination volume of the target domain such that, if a disaster arises, storage on the destination volume can be recovered in a manner that maintains the order of writes issued to the source volume by the user application.

Often the write interception component is upgraded to a new software version having, e.g., different data structures and functionality (features/services). A common approach used to perform such an upgrade is to modify the data structures in an "old" version of the software component to comply with the data structures in the new version. Once this completes, the computer is rebooted to run with the new data structures. The problem with this approach involves the substantial resources needed to (i) identify the data structures that require modification, (ii) rewriting code to modify those identified data structures and (iii) verifying the accuracy of the rewritten code. Thus, a substantial amount of resources is consumed for every upgrade.

In addition, upgrade of a typical software component, such as an application, generally involves halting (interrupting) operation of the old version of the component and subsequent installation of a "new" version of the software. However, if operation of the write interception component is interrupted to enable installation of an upgraded version, interception of writes may be disrupted (missed), causing inconsistency between data stored on the source and destination volumes. As a result, a resynchronization procedure must be performed to re-synchronize the data on the destination volume with the data on the source volume, which is time consuming. Furthermore, if a failure (disaster) occurs at the replication client during the resynchronization procedure, the data on the destination volume may not be consistent with the data on the source volume and, as such, may not be reliably used for disaster recovery, as intended with the replication system.

SUMMARY OF THE INVENTION

The present invention overcomes the disadvantages of the prior art by providing a software upgrade tool and procedure adapted to provide uninterrupted operation of a replication system during an upgrade of software components of the system. The replication system includes one or more user systems coupled to one or more target storage systems over a communications network, such as a computer network. Illustratively, each user system is embodied as a replication client, while each target storage system is embodied as a replication server. In addition, the replication system includes a management system embodied as a management server that manages configuration of the system, including during upgrade of the software components of the replication system. To that end, the software upgrade tool cooperates with the management server to query the configuration of "old" versions of the software components and to manage upgrades of those components to "new" versions of software. According to the invention, the upgrade tool and procedure enable both the old and new versions of the software components to run concurrently on the replication client and replication server, as well as the management server.

In response to an upgrade request, the upgrade tool queries, e.g., an old version of a software component of the management server as to the configuration of the old versions of the replication system components, and then instructs a new version of the management server component to build that substantially identical configuration on the new versions of the components. That is, the upgrade tool instructs the management server component to examine the contents, e.g., the data structures and features/services, of the old configuration of the replication system and provide those contents to the new configuration of replication system. Once a new version of each component, including a write interception component, is upgraded and operational, e.g., intercepting write operations or "writes", then the old version of the component is uninstalled, thereby ensuring that no intercepted writes are missed.

Advantageously, the invention provides an upgrade tool and procedure that activates two versions of the replication system components, i.e., the old versions plus the new upgraded versions, have them operate simultaneously until the upgrade is complete and then de-activate the old versions to thereby obviate loss of writes. The novel upgrade tool and procedure reduce the time needed to perform conventional upgrades, including modifications to data structures, while also eliminating system vulnerability to lost writes.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

Figure 1:
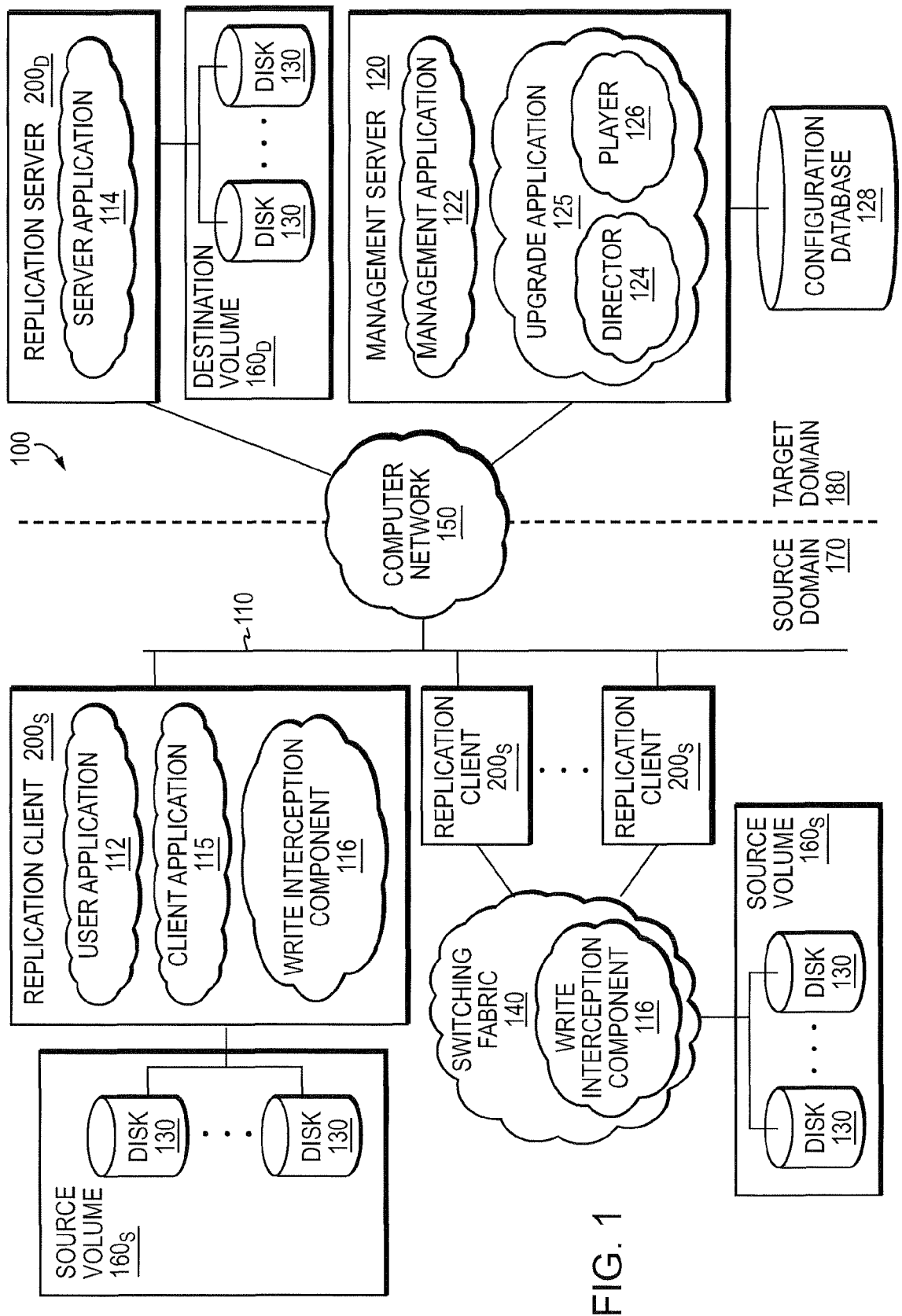
FIG. 1 is a schematic block diagram of a replication system that may be advantageously used with the present invention.

FIG. 1 is a schematic block diagram of a replication system 100, such as a data backup and recovery replication system, which includes a plurality of user systems, a target storage system and a management system that may be advantageously used with the present invention. The user systems are illustratively computers embodied as replication (source) clients $200_S$, while the target storage system is illustratively a computer embodied as a replication (destination) server $200_D$ and the management system is a computer embodied as a management server 120. Each computer is configured to execute software components that comprise a collection of executable software modules embodied as, e.g., applications. For example, client application 115 executes in the replication client, server application 114 executes in the replication server and management application 122 executes in the management server 120.

Storage of information on each computer $200_{S,D}$ is preferably implemented as one or more storage "volumes", such as source volume $160_S$ and destination volume $160_D$, that comprise a collection of physical storage disks 130 cooperating to define an overall logical arrangement of storage space on the volume(s). A replication client $200_S$ may be directly connected to the source volume $160_S$ via a direct access storage arrangement or may be indirectly connected to the volume over a switching fabric 140, which may comprise a conventional Ethernet or Fibre Channel (FC) switch. As described herein, a software module may also be embodied as a write interception component 116 that executes in the replication client $200_S$ or in the switching fabric 140.

In an illustrative embodiment, the replication clients $200_S$ and source volumes $160_S$ are interconnected by a local area network 110 and organized as components of a source domain 170, while the management server 120, replication server $200_D$ and destination volume $160_D$ are organized as components of a target domain 180. The source domain components are coupled to the target domain components over a computer network 150, which may comprise a plurality of point-to-point connections or communication links of, e.g., a wide area network embodied as an Ethernet network or a FC network. The components of each domain may communicate over network 150 by exchanging discrete frames or packets of data according to pre-defined protocols, such as the Transmission Control Protocol/Internet Protocol (TCP/IP).

Figure 2:
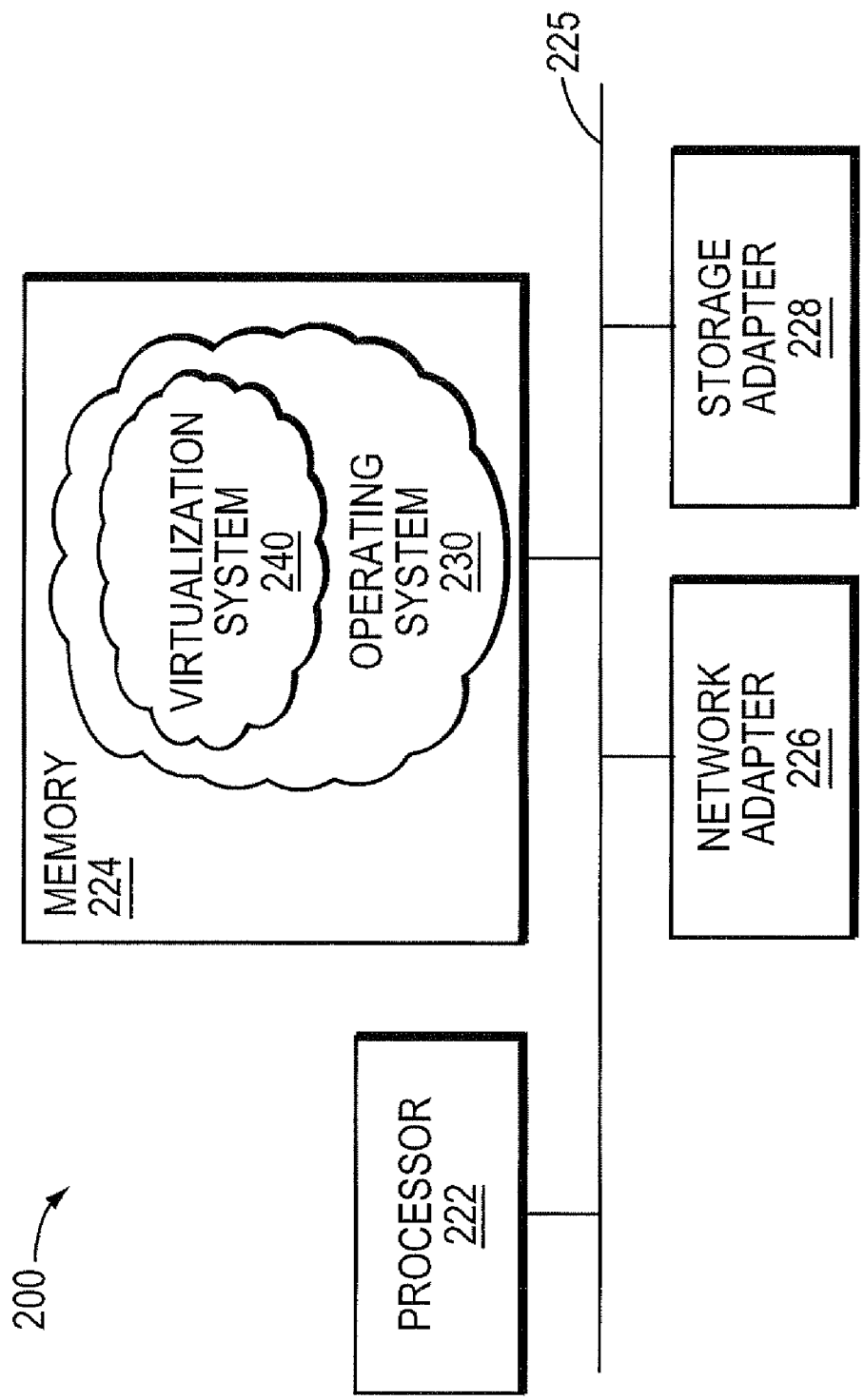
FIG. 2 is a schematic block diagram of a computer that may be advantageously used with the present invention.

FIG. 2 is a schematic block diagram of a computer 200 that may be advantageously used with one or more embodiments described herein as, e.g., a replication client $200_S$, replication server $200_D$ or management server 120. Each computer 200 comprises a processor 222, a memory 224, a network adapter 226 and a storage adapter 228 interconnected by a system bus 225. The network adapter 226 comprises the mechanical, electrical and signaling circuitry needed to connect the computer 200 to the switching fabric 140 or computer network 150. Each computer 200 also includes an operating system 230 that may implement a virtualization system 240 to logically organize the information as a hierarchical structure of data containers, such as directories, files and logical units (luns). The virtualization system may be abstracted through the use of a database management system, a volume manager or a file system.

In an illustrative embodiment, the memory 224 comprises storage locations that are addressable by the processor and adapters for storing software programs and data structures associated with the present invention. The processor and adapters may, in turn, comprise processing elements and/or logic adapted to execute the software programs and manipulate the data structures. Operating system 230, portions of which is typically resident in memory and executed by the processing elements, functionally organizes the computer 200 by, inter alia, invoking operations in support of processes, modules and/or applications, such as client, server and management applications 115, 114, 122, executing on the computer. It will be apparent to those skilled in the art that other processing and memory means, including various computer readable media, may be used to store and execute program instructions pertaining to the inventive technique described herein.

The storage adapter 228 cooperates with the operating system 230 executing on the computer 200 to access information requested by, e.g., a user or user application 112. The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on the disks 130. The storage adapter includes input/output (I/O) interface circuitry that couples to the disks over an I/O interconnect arrangement, such as a conventional high-performance, FC serial link topology.

To facilitate access to the disks 130, the operating system 230 implements a database management system, volume manager or file system that cooperates with virtualization modules to provide virtualization system 240 that "virtualizes" the storage space provided by disks 130. The virtualization system logically organizes the information as a hierarchical structure of named data containers, such as directories and files on the disks. Each "on-disk" file may be implemented as set of disk blocks configured to store information, such as data, whereas the directory may be implemented as a specially formatted file in which names and links to other files and directories are stored. The virtualization modules further logically organize information as a hierarchical structure of data containers, such as blocks, on the disks that are exported as named luns.

In an illustrative embodiment, user application 112, such as a database application, executes in replication client $200_S$ to issue storage requests to access data containers stored on the source volume $160_S$ of the source domain 170. The virtualization system 240 transposes the storage requests into file system requests for local storage on the source volume $160_S$, to thereby serve the storage requests issued by the user application 112. The storage requests are illustratively write operations ("writes"). The write interception component 116 intercepts the writes and cooperates with client application 115 to replicate them to the replication server $200_D$ of the target domain 180, where the intercepted writes are stored for, e.g., data backup and/or disaster recovery purposes. The writes are thereafter consistently stored on the destination volume $160_D$ by server application 114 (and its associated modules described herein) such that, if a disaster arises, the storage on that storage space can be recovered in a manner that maintains the order of writes issued to the source volume by the user application. The write interception component 116 may reside (i) in the replication client $200_S$ (e.g., embodied as a device driver of the operating system) or (ii) within the switching fabric 140 (e.g., embodied as a software module in the network switch), such that the component may intercept the writes in block-level or file-level semantics.

A system administrator or user initially installs (loads) the software components onto the computers of the replication system 100 and then updates the configuration of the system by issuing commands to the management application 122. Illustratively, these commands may include, e.g., add a software component to the replication client $200_S$, and/or replication server $200_D$, add a source volume $160_S$ to the replication client and/or a destination volume $160_D$ to the replication server, configure a replication client-replication server "pair" between the source volume and destination volume, etc. The commands are generally entered by the user through a graphical user interface (GUI) and/or command line interface (CLI) of the management server.

The present invention is directed to a software upgrade tool and procedure adapted to provide uninterrupted operation of the replication system 100 during an upgrade of the software components of the system. The management server 120 is configured to manage configuration of the replication system, including during upgrade of the software components. To that end, the software upgrade tool cooperates with the management server to query the configuration of "old" versions of the software components and to manage upgrades of those components to "new" versions of software. According to the invention, the upgrade tool and procedure enable both the old and new versions of the software components to run concurrently on the replication client $200_S$ and replication server $200_D$, as well as the management server 120.

The upgrade tool is illustratively embodied as an upgrade application 125 comprising a director module 124 and a player module 126. The upgrade tool is generally not a software component of the replication system 100, although it is initially installed on the management server 120. The upgrade application may execute locally on the management server 120 or remotely on any computer, e.g., a laptop or desktop computer, external (remote) to the replication system to enable configuration of a software upgrade to the system 100 by the user. In either case, the upgrade application 125 is invoked to establish communication with the management application 122 (i.e., locally via an internal channel of the management server or remotely over the computer network 150).

In response to a software upgrade request issued by the user, the entire collection of software components executing on the replication system, e.g., the client, server and management applications 115, 114 and 122, as well as the write interception component 116, is illustratively upgraded from old versions to new versions. Note that, as in the case of initial installation of the software components, the user installs the new versions of the software components onto the computers of the replication system 100 and then initiates the configuration upgrade by issuing commands to the management application 122 via the upgrade application 125. The upgrade application queries, e.g., an old version of a software component (management application) of the management server as to the configuration of the old versions of the replication system components, and then instructs a new version of the management application to build that substantially identical configuration on the new versions of the components. That is, the upgrade application instructs the management application to examine the contents, e.g., data structures and features/services, of the old configuration of the replication system and provide those contents to the new configuration of replication system. Once a new version of each component, including the write interception component, is upgraded and operational, e.g., intercepting writes, then the old version of the component is uninstalled, thereby ensuring that no intercepted writes are missed.

The upgrade application 125 illustratively performs the configuration upgrade by controlling both the old and new versions of the management application 122 executing on the management server 120 using the player and director modules 126, 124. Specifically, the player module 126 is configured to interact with (and control) the old version of the management application 122, while the director module 124 is configured to interact with (and control) the new version of the management application 122. Notably, the director module controls the upgrade by interacting with the user and controlling both the new version of replication system through the new management application and the old version of the system through the player module. For example, the player module 126 of the upgrade application may instruct the old version of the management application to query, e.g., a configuration database 126 maintained by the management server. The configuration database 126 illustratively contains information relating to the configuration of the current (old) version of the replication system 100 (e.g., the old configuration). As used herein, configuration denotes the representation of software components (executing on the computers of the replication system) as objects stored on the configuration database 128, e.g., a client application object, a server application object, and a replication connection between source/destination volumes of the replication client/replication server (a "pair" object). The management application 122 constantly queries those components and records any changes in the objects of the database 126.

The director module 124 of the upgrade application 125 may also instruct the new version of the management application 122 to manage configuration of new versions of the components, which new versions may include, e.g., additional data structures and/or features/services. As described herein, these data structures may include bitmap and log data structures, as well as a registry adapted to store the configuration information, etc. As noted, the user (manually) installs the new versions of the components onto their respective computers of the replication system such that, before the upgrade commences, both the old and new versions of the software components are running on the computers at the same time (simultaneously). Thus, the configuration state of the new version of the replication system (maintained in the new configuration of the configuration database) is "empty", i.e., not configured for the replication system. Meanwhile the configuration state of the old version of the system is the existing configuration. Thereafter, the director module 124 instructs the new version of the management application 122 to configure the new version of the system to resemble the old, existing version of the system.

Operationally, the upgrade application 125 cooperates (interacts) with the old version of the management application 122 to retrieve the configuration of the old version of the replication system 100. To that end, the director module 124 instructs the player module 126 to contact the old version of the management application to retrieve the contents of the old configuration, i.e., the configuration of the existing versions of the client application/write interception component (object), server application (object), management application (object), any replication pairs (objects), etc. The upgrade application then uses that existing configuration to configure a new configuration of the system. In particular, the director module 124 of the upgrade application 125 cooperates with the new version of the management application 122 to provide configuration commands that instruct the server to, e.g., add a client application (object), add a server application (object), add a pair (object), etc, to the new configuration. In response, the new version of the management application connects to the new versions of those components and instructs them to configure themselves according to, e.g., supplied parameters.

For example, in the case of the configuration command that adds a client application to the replication client, the new version of the management application 122 contacts the new version of the client application 115 to establish a communication channel using parameters such as, e.g., a network address of the new client application executing on the replication client, as well as a fully qualified path name for a source volume $160_S$ of the client $200_S$. Note that the management application 122 does not communicate directly with the write interception component (kernel driver), but rather communicates with that driver through the client application 115. Thus, configuration upgrade of the write interception component is illustratively affected through the client application 115. Similarly, for the command that adds a server application 144 to the replication server, the new version of the management application 122 contacts the new version of server application using parameters to establish a communication channel between the applications.

For the command that adds a replication pair to the system, the new version of the management application contacts the new versions of (i) client application 115 which, in turn, contacts the write interception component 116 through an internal channel, such as an interprocess communication (IPC) channel, and (ii) server application 114 to instruct them to establish a communication channel for replication. Here, the new versions of the write interception component (via the client application) and server application are instructed as to, e.g., the user application 112 from which writes will be intercepted by the driver and the destination volume $160_D$ serviced by the server application to which the intercepted writes will be sent. However, before configuration of the replication system is actually updated to the new version, both the old and new versions of the system are placed into a "freeze" state in which nothing is actually written to the destination volume.

Instead, the intercepted writes are logged into persistent storage, e.g., a bitmap volume located on disk, at the replication client $200_S$.

Figure 3:
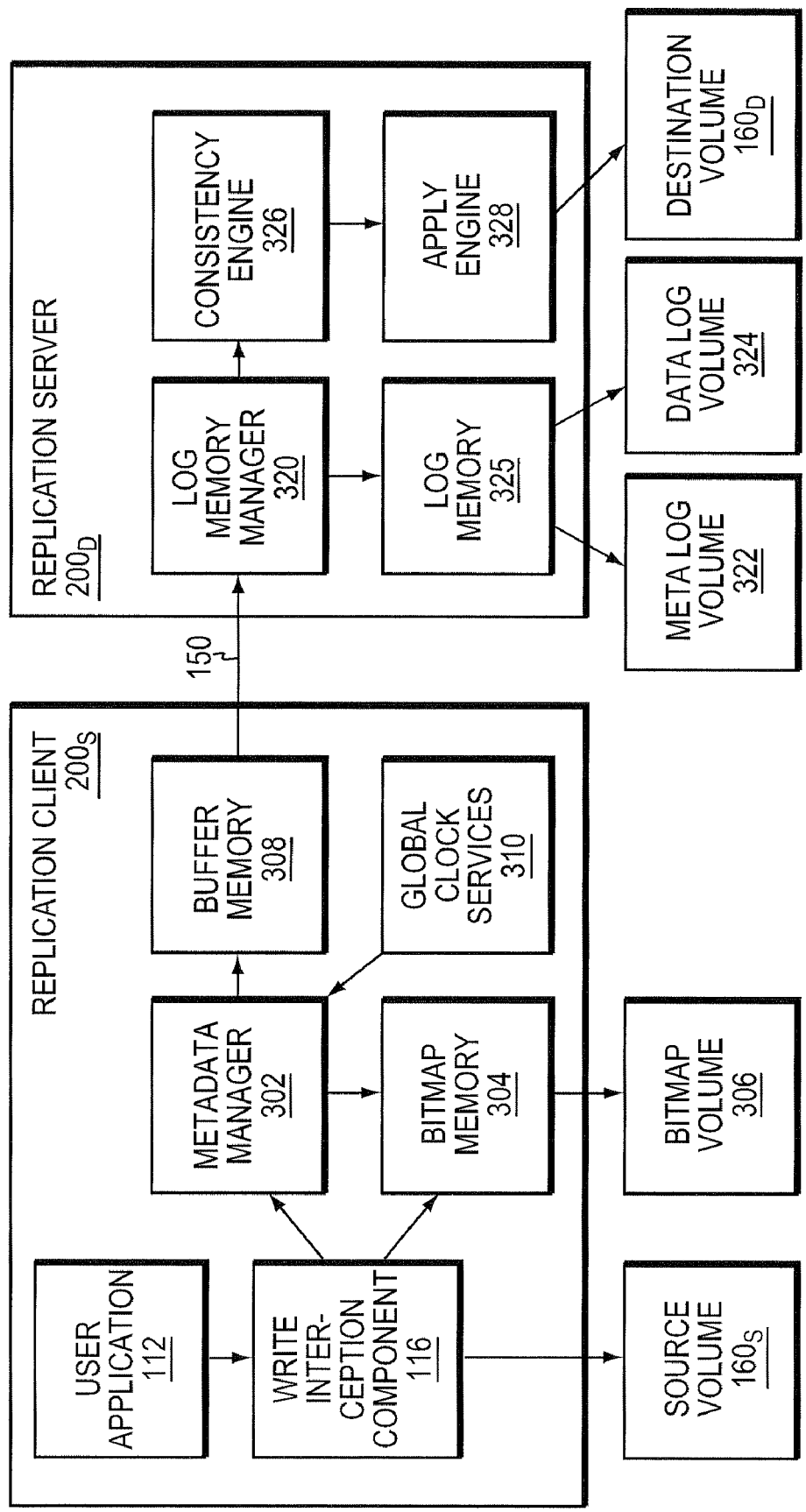
FIG. 3 is a schematic block diagram of various components and data structures of a replication client and server that may be advantageously used with the present invention.

FIG. 3 is a schematic block diagram of various components and data structures of the replication client and server that may be advantageously used with one or more embodiments described herein. User application 112 executes on the replication client $200_S$ and issues write operations (writes) to its source volume $160_S$. These writes are intercepted by the write interception component 116 illustratively located within a kernel driver of the replication client operating system. Upon intercepting (e.g., copying) the writes, the write interception component 116 forwards write data associated with the writes, as well as information describing the writes, to the client application for storage in one or more data structures on the replication client. The writes are then allowed to propagate to the source volume $160_S$. Note that in an alternative embodiment, the write interception component 116 may be located in a switch fabric, while the associated process and data structures are located on a dedicated computer (e.g., an appliance).

The write interception component illustratively operates at a block level to intercept writes directed to certain addresses or address ranges (e.g., extents) of the storage space on the volume(s). The write data of each intercepted write, as well as "metadata" describing the intercepted write, are forwarded to a metadata manager module 302, which illustratively runs in both the client application 115 and the write interception component 116 of the replication client. Examples of descriptive metadata include the time at which the write occurred (provided by global clock services 310 of the client application) and the address range of the write. The metadata manager then stores the write data and metadata associated with the intercepted write in a buffer memory 308 of the replication client $200_S$.

In addition, the write interception component 116 (and/or metadata manager 302) set one or more bits in a bitmap memory 304 corresponding to the intercepted write. Each bit in the bitmap memory reflects a region (address location) in the source volume $160_S$ and, during resynchronization, that region is read from the source volume to obtain the state of its contents. Thus, for every address location on the source volume there is a corresponding bit in a bitmap memory 304. When the user application 112 writes data to a particular address location on the source volume $160_S$, a bit of the bitmap memory 304 corresponding to that address location is set. The contents of the bitmap memory, which are embodied in volatile memory, are reflected on persistent storage of a bitmap volume 306. While the embodiment herein describes one or bitmap memories and bitmap volumes, it should be understood to those skilled in the art that other data structures and organizations of data may be advantageously used in accordance with the invention.

The intercepted writes are then forwarded over the network 150 to the replication server $200_D$, where they are temporarily stored (logged) in a log memory 325 controlled by a log memory manager 320 of the server application 114. The metadata associated with the intercepted write is thereafter persistently stored on a metadata log volume 322, while the write data is persistently stored on a data log volume 324. Note that once the write data has been transferred to the replication server and logged in the log volumes, the corresponding bits may be erased from the bitmap volume 306. Yet, at any point in time before the data is applied to the destination volume $160_D$, that data is reflected in either the log or the bitmap volume. The intercepted writes are then provided to a consistency engine module 326 of the server application 114, which module is configured to establish and maintain a consistency timeline for storing the write data on the destination volume. Once the consistency timeline is established, an apply engine module 328 of the server application retrieves the data from the log volume through the log memory and applies it to the destination volume $160_D$.

Once installed, both the new (and old) versions of the replication system are configured to intercept and process the same writes issued from the user application 112 (although the new version of the system is not actually intercepting the writes). More specifically, the old and new versions of write interception component 116 are configured to intercept writes at the replication client, forward the intercepted writes to the replication server and allow the writes to propagate to a single set of source volumes $160_S$. In addition, two metadata managers 302, two bitmap memories 304, one or two sets of bitmap volumes 306 and two buffer memories 308 (i.e., one for each old and new version) on the replication client $160_S$ are configured to receive the intercepted writes from their respective write interception components. On the replication server $160_D$, two log memory managers 320, two log memories 325, two sets of metadata log volumes 322 and data log volumes 324, two consistency engines 326 and two apply engines 328 (i.e., one for each old and new version) are configured to receive the intercepted writes from the replication client and prepare the write data for storage one set of destination volumes $160_D$.

When the upgrade procedure commences, the new and old versions of the management application 122 are placed into an upgrade mode to prevent processing of any further configuration commands from the user (although monitoring commands may be allowed). In addition, the user instructs (i) the replication client $200_S$ to stop transferring data to the replication server $200_D$ and (ii) the replication server to stop applying data to the destination volume $160_D$. In the former case, the replication client continues intercepting writes and recording/registering those intercepted writes in the bitmap memory/volume, but does not store the intercepted write data (e.g., to avoid buffer overflow of the buffer memory). In this manner, the replication client does not lose any writes, i.e., information is maintained indicating that certain storage locations are dirty and, if necessary, the contents of those locations can be read from the source volume $160_S$.

Assume that during the initial stages of the upgrade procedure the user application 112 has written data A, B, C to the source volume $160_S$, but only data A is stored on the destination volume $160_D$. Data B is stored in the log volumes 322, 324 of the replication server $200_D$ and data C is reflected in the bitmap volume 306 of the replication client $200_S$. The replication system is then placed into the freeze state in which the apply engine 328 is halted (i.e., prevented) from applying any data to the destination volume. Note that the freeze state, as described herein, generally also denotes a "transfer mode disable state" in which the metadata manager 302 is instructed to stop transferring data to the server application 114. In addition, the old version of the write interception component 116 is instructed to enter a "bitmap-only" mode to continue registering intercepted writes on the old version of the bitmap volume 306. Thus, if the user application 112 subsequently writes data D, E, F to the source volume $160_S$, the old version of write interception component registers corresponding bits in the bitmap volume. As a result, the old version of the write interception component 116 continues intercepting writes but only registers those writes by recording corresponding bits of the old version of the bitmap volume.

Thereafter, the new configuration of the replication system completes, and the new version of the write interception component intercepts writes and registers them in the new version of the bitmap volume. For example, data X, Y, Z are registered in both the old and new versions of the bitmap volume 306. Note the state of the new version bitmap volume is different from the old version state because the old version of the bitmap volume includes representations of, e.g., data A, B, C. The old version of the bitmap volume is then merged with the new version of the bitmap volume to synchronize the volumes such that the new version of the bitmap volume reflects, e.g. data A, B, C . . . X, Y, Z. Furthermore, the old version of the server application 114 (and its associated modules) are instructed to translate the data in the old version of the log memory (e.g., B) in terms of a bitmap, i.e., identify data B location on the source/destination volume to enable setting of the relevant bits of the bitmap volume 306.

The upgrade procedure then proceeds to remove the old configuration of the replication system from the configuration database. Here, the upgrade application 125 instructs the old version of the management application 122 to remove the old configuration using commands such as e.g., remove pair (object), remove client application (object), remove server application (object), etc., which commands are essentially the opposite of the add commands described above. In response, the old version of the management application "empties" the old configuration and the old versions of the replication client and server components are uninstalled (e.g., manually by the user). The new configuration of the replication system is then placed into a resynchronization mode (e.g., manually by the user) that resynchronizes the newly intercepted write data with the old write data, e.g., A, B, C . . . X, Y, Z. That is, the contents of the storage locations registered in the merged bitmap volume are retrieved from the source volume $160_S$ and reflected (copied) on the destination volume $160_D$. Later, the old configuration of the replication system is removed. The new versions of the software components are then transitioned out of the freeze state (e.g., manually by the user) and continue to seamlessly intercept the writes, but now with the ability to forward the intercepted writes onto the replication server for storage on the destination volume. Accordingly, the upgrade procedure transforms the configuration of the replication system from an old version to a new version without interrupting operation of the replication system, i.e., without losing any writes.

Figure 4:
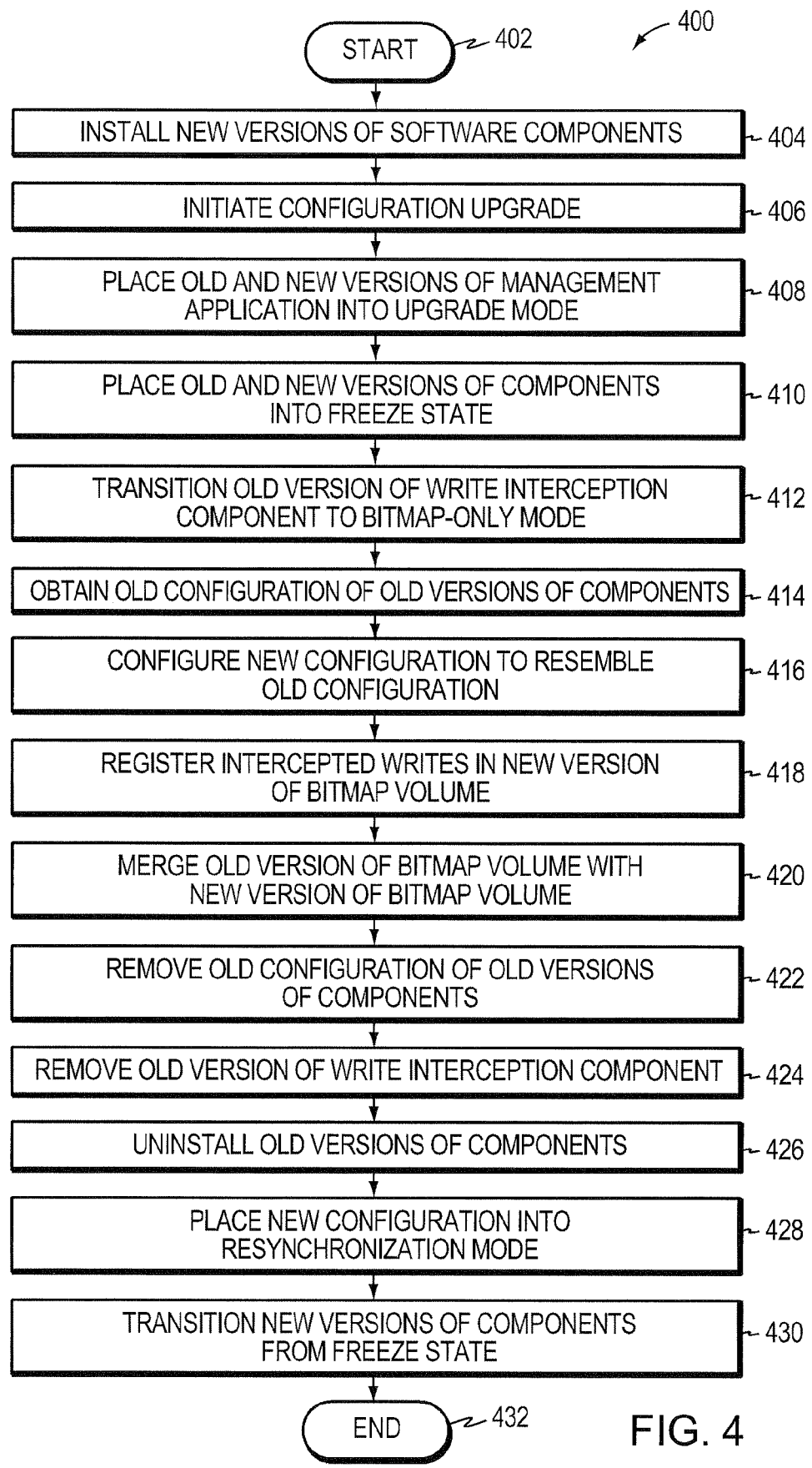
FIG. 4 is a flowchart illustrating an upgrade procedure for initiating a configuration upgrade of the replication system in accordance with the present invention.

FIG. 4 is a flowchart illustrating the upgrade procedure for initiating a configuration upgrade of the replication system in accordance with the present invention. The procedure 400 starts at Step 402 and proceeds to Step 404 where a system administrator or user installs new versions of the software components onto the computers of the replication system such that both old and new versions of the software components are running on the computers simultaneously. In Step 406, the user invokes the upgrade application to initiate the configuration upgrade. In Step 408, the old and new versions of the management application are placed into upgrade mode to prevent processing of any further configuration commands and, in Step 410, both the old and new versions of the software components are placed into a freeze state in which any intercepted writes are stored on a log volume (as opposed to the destination volume) at the replication server. In Step 412, the old version of the write interception component is placed into (transitioned to) bitmap-only mode to continue registering intercepted writes on the old version of the bitmap volume.

In Step 414, the player module of the upgrade application queries, e.g., an old version of the management application component to obtain the old configuration of the old versions of the software components as stored on the configuration database and, in Step 416, the director module of the upgrade application instructs the new version of the management application component to configure the new configuration of the system to resemble the old configuration of the system, i.e., configure the new versions of the components substantially identical to the old versions of the components. In Step 418, the new version of the write interception component also intercepts writes and registers them in the new version of the bitmap volume. In Step 420, the old version of the bitmap volume is merged with the new version of the bitmap volume to synchronize the volumes.

In Step 422, the old configuration of the old versions of the software components of the replication system is removed from the configuration database and, in Step 424, the old version of the write interception component is removed. In Step 426, the old versions of the software components are uninstalled, e.g., manually by the user. In Step 428, the new configuration of the replication system is placed into a resynchronization mode that resynchronizes the newly intercepted write data with the old write data by, e.g., retrieving the contents of the storage locations registered in the merged bitmap volume from the source volume and copying them to the destination volume $160_D$. In Step 430, the new versions of the software components are transitioned from (out of) the freeze state and back to a normal mode of operation. The procedure then ends at Step 432.

Advantageously, the invention provides an upgrade tool and procedure that activates two versions of the replication system components, i.e., the old versions plus the new upgraded versions, have them operate simultaneously until the upgrade is complete and then de-activate the old versions to thereby obviate loss of writes. The novel upgrade tool and procedure reduce the time needed to perform conventional upgrades, including modifications to data structures, while also eliminating system vulnerability to lost writes.

The foregoing description has been directed to specific embodiments of this invention. It will be apparent, however, that other variations and modifications may be made to the described embodiments, with the attainment of some or all of their advantages. For instance, it is expressly contemplated that the processes, modules and/or components described herein can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for providing uninterrupted operation of a replication system during an upgrade of software components of the replication system, comprising:

installing a new version of the software components at the replication system to enable both an old version of the software components and the new version of the software components to run on the replication system simultaneously;

configuring a new configuration of the replication system comprising a new version of a bitmap to resemble an old configuration of the replication system comprising an old version of the bitmap;

intercepting a first write operation and registering the first intercepted write operation in the old version of the bitmap;

intercepting a second write operation and registering the second intercepted write operation in the new version of the bitmap;

merging the old version of the bitmap with the new version of the bitmap;

removing the old configuration from the replication system; and uninstalling the old version of the software components.

2. The method of claim 1 wherein at least one of the software components comprises a management application component.

3. The method of claim 2 further comprising invoking an upgrade 2 application to initiate the configuration upgrade, the upgrade application comprising player and director modules cooperating with the management application component to manage the upgrades of the software components.

4. The method of claim 3 further comprising placing the management application component into an upgrade mode where processing of configuration commands is prevented.

5. The method of claim 3 further comprising querying, by the player module, an old version of the management application component to obtain the old configuration of the replication system.

6. The method of claim 3 further comprising instructing, by the director module, a new version of the management application component to add a new versions of the software components to the new configuration of the replication system.

7. The method of claim 1 wherein at least one of the software components comprises a write interception component configured to intercept the first and second write operations issued by a user application for storage on a source volume of a replication client.

8. The method of claim 7 further comprising placing the old and new versions of the software components into a freeze state in which an intercepted write operation is stored on a log volume of a replication server.

9. The method of claim 8 wherein the new version of the bitmap comprises a bitmap volume of the replication client.

10. The method of claim 1 further comprising:

wherein intercepting the second write operation comprises intercepting the second write operation at the new version of a write interception component of the new version of the software components.

11. The method of claim 10 further comprising, in response to uninstalling the old version of the software components, transitioning the old version of the configuration to the new version of the configuration without interrupting operation of the replication system.

12. The method of claim 8 further comprising:

retrieving contents of storage locations registered in the merged bitmap from a source volume of the replication client;

copying the retrieved contents to a destination volume of the replication server; and transitioning the new versions of the software components from the freeze state.

13. A system configured to provide uninterrupted operation of a replication system during an upgrade of components, comprising:

a write interception component coupled to a replication client, the write interception component configured to intercept write operations issued by the replication client;

a processor of the replication client configured to execute a client application component, the client application configured to cooperate with the write interception component to forward the intercepted write operations to a replication server;

the replication server configured to execute a server application component, the server application component configured to consistently store the intercepted writes on a destination volume of the replication server;

a management server configured to execute a management application component, the management application component configured to manage configuration of the replication system, during the upgrade of the components of the system; and an upgrade tool configured to cooperate with the management application component to manage the upgrade of the components from old versions to new versions in accordance with an upgrade procedure, the upgrade procedure configured to enable both the old and new versions of the components to run concurrently on the replication system, the upgrade procedure further configured to register a first intercepted write operation of the intercepted write operations in the old version of the bitmap, register a second intercepted write operation of the intercepted write operations in the new version of the bitmap, merge an old version of a bitmap associated with the old version of the components with a new version of the bitmap associated with the new version of the components to obviate interruption of the replication system operation; and program instructions configured to uninstall the old versions of the components.

14. The system of claim 13 further comprising a user application component executing on the replication client, the user application component configured to issue the write operations for storage on a source volume of the replication client.

15. The system of claim 13 wherein the upgrade tool is further configured to, in response to an upgrade request:

query an old version of the management application component for an old configuration of the old versions of the components of the replication system; and instruct a new version of the management application component to build a new configuration of the new versions of the components using the old versions of the components.

16. The system of claim 15 wherein the upgrade tool is further configured to:

instruct the new version of the management application component to examine contents of the old configuration of the replication system and further configured to provide the contents to the new configuration of replication system.

17. The system of claim 16 wherein the contents of the old configuration comprise one or more of data structures, features and services.

18. The system of claim 13 wherein the upgrade tool comprises an upgrade application, wherein the upgrade application comprises a player and a director modules.

19. The system of claim 13 wherein the upgrade tool comprises an application configured to execute on one of a computer external to the replication system and the management server to enable configuration of the software upgrade to the replication system.

20. An apparatus configured to provide uninterrupted operation of a replication system during an upgrade of software components of the replicated system, comprising:

means for installing a new versions of the software components at the replication system to enable both an old version of the software component and a new version of the software components to run on the replication system simultaneously;

means for configuring a new configuration of the replication system comprising a new version of a data structure to resemble an old configuration of the replication system comprising an old version of the data structure;

means for intercepting a first write operation and means for registering the first intercepted write operation in the old version of the data structure;

means for intercepting a second write operation and means for registering the second intercepted write operation in the new version of the data structure;

means for merging the old version of the data structure with the new version of the data structure;

means for removing the old configuration from the replication system; and means for uninstalling the old version of the software components.

21. A non-transitory computer-readable storage medium stored with executable program instructions for execution by a processor, the computer-readable storage medium comprising:

program instructions that install a new version of a software components at a replication system to enable both an old version of the software components and a new versions of the software components to run on the replication system simultaneously;

program instructions that configure a new configuration of the replication system comprising a new version of a data structure to resemble an old configuration of the replication system comprising an old version of the data structure;

program instructions that intercept a first write operation;

program instructions that register the first intercepted write operation in the old version of the bitmap;

program instructions that intercept a second write operation;

program instructions that register the second intercepted write operation in the new version of the bitmap;

program instructions that merge the old version of the bitmap with the new version of the bitmap;

program instructions that removing the old configuration from the replication system; and program instructions that uninstall the old versions of the software component.

* * * * *

UNITED STATES PATENT AND TRADEMARK OFFICE
CERTIFICATE OF CORRECTION

PATENT NO. : 8,099,727 B2   Page 1 of 1
APPLICATION NO. : 11/756904
DATED : January 17, 2012
INVENTOR(S) : Lior Bahat et al.

It is certified that error appears in the above-identified patent and that said Letters Patent is hereby corrected as shown below:

In col. 12, line 29 should read:
  cation component to add a new ~~versions~~ version of the software In col. 14, line 3 should read:
  tion comprises a player and a director ~~modules~~module.

In col. 14, line 12 should read:
  means for installing a new ~~versions~~ version of the software com- In col. 14, line 14 should read:
  version of the software ~~component~~ components and ~~a~~ the new version of In col. 14, line 37 should read:
  ware components at a replication system to enable both In col. 14, line 38 should read:
  an old version of the software ~~components~~ component and a new In col. 14, line 39 should read:
  ~~versions~~ version of the software ~~components~~ component to run on the rep- Signed and Sealed this
Sixth Day of November, 2012

David J. Kappos
*Director of the United States Patent and Trademark Office*